(12) United States Patent
Lee et al.

(10) Patent No.: US 12,039,640 B2
(45) Date of Patent: Jul. 16, 2024

(54) KEYBOARD FILE VERIFICATION METHOD BASED ON IMAGE PROCESSING

(71) Applicants: Inventec (Pudong) Technology Corporation, Shanghai (CN); INVENTEC CORPORATION, Taipei (TW)

(72) Inventors: Hao Hsuan Lee, Taipei (TW); Trista Pei-Chun Chen, Taipei (TW); Meng-Chia Hung, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 356 days.

(21) Appl. No.: 17/547,380

(22) Filed: Dec. 10, 2021

(65) Prior Publication Data

US 2023/0078035 A1 Mar. 16, 2023

(30) Foreign Application Priority Data

Sep. 13, 2021 (CN) .......................... 202111070143.6

(51) Int. Cl.
*G06T 11/00* (2006.01)
*G06F 16/53* (2019.01)
(Continued)

(52) U.S. Cl.
CPC .............. *G06T 11/20* (2013.01); *G06F 16/53* (2019.01); *G06T 3/40* (2013.01); *G06T 2210/12* (2013.01)

(58) Field of Classification Search
CPC ....... G06T 11/20; G06T 3/40; G06T 2210/12; G06T 2207/20064; G06T 7/11;
(Continued)

(56) References Cited

U.S. PATENT DOCUMENTS

2014/0126805 A1* 5/2014 Lin .......................... G06T 7/001
382/149
2018/0046650 A1* 2/2018 Lavi ..................... G06F 16/5854
(Continued)

OTHER PUBLICATIONS

Hong et al, Keyboard Defects Detection Based on Template Matching Method, International Conference on Information Engineering and Communications Technology (IECT 2016) (Year: 2016).*
(Continued)

*Primary Examiner* — Ping Y Hsieh
*Assistant Examiner* — Xiao Liu
(74) *Attorney, Agent, or Firm* — Locke Lord LLP; Tim Tingkang Xia, Esq.

(57) ABSTRACT

A keyboard file verification method based on image processing comprises controlling a processor to perform following operations: obtaining a keyboard file; generating, according to the keyboard file, a search index and a feature image; obtaining a template image from a template database according to the search index; performing a calibration operation according to the feature image, wherein the calibration operation comprises: adjusting a resolution of the feature image according to a resolution of the template image; performing a shifting operation according to the feature image, to generate a plurality of candidate images; and comparing a key block of each of the plurality of candidate images with a key block of the template image to generate a difference map and a comparison result.

7 Claims, 6 Drawing Sheets

(51) Int. Cl.
*G06T 3/40* (2006.01)
*G06T 11/20* (2006.01)

(58) Field of Classification Search
CPC ......... G06T 7/136; G06T 7/155; G06T 7/001; G06F 16/53
See application file for complete search history.

(56) References Cited

U.S. PATENT DOCUMENTS

| | | | |
|---|---|---|---|
| 2020/0183880 A1* | 6/2020 | Shah | H04L 51/214 |
| 2023/0196096 A1* | 6/2023 | Milne | G06T 7/0004 |
| | | | 706/25 |

OTHER PUBLICATIONS

Georgios et al., Parametric Image Alignment Using Enhance Correlation Coefficient Maximization, IEEE Tr. On Pattern Analysis and Machine Learning, vol. 30, No. 10, pp. 1858-1865, Oct. (Year: 2008).*

* cited by examiner

KEYBOARD FILE VERIFICATION METHOD BASED ON IMAGE PROCESSING

CROSS-REFERENCE TO RELATED APPLICATIONS

This non-provisional application claims priority under 35 U.S.C. § 119(a) on Patent Application No(s). 202111070143.6 filed in China, on Sep. 13, 2021, the entire contents of which are hereby incorporated by reference.

BACKGROUND

1. Technical Field

The present disclosure relates to image processing, and more particular to a keyboard file verification method based on image processing.

2. Related Art

Keyboard is one of the key components of a laptop computer, before assembling a laptop product, it is necessary to ensure that the keyboard design in the specification as well as the physical keyboard sample are verified. It can be costly to allow an abnormal or defective design, either in the design stage or the assembling stage, to enter the production process.

Traditionally, verification of the keyboard file provided by the supplier relies highly on human labor. The quality assurance personnel needs to carefully inspect with naked eyes the differences between the keyboard file from the supplier and the reference keyboard design in the database. However, there are a large number of keyboard samples on the production line that need to be checked constantly, when the quality assurance personnel conducts visual inspection for a long time, it is easy to reduce the quality of the verification due to negligence.

SUMMARY

According to an embodiment of the present disclosure, a keyboard file verification method based on image processing comprises controlling a processor to perform following operations: obtaining a keyboard file; generating, according to the keyboard file, a search index and a feature image; obtaining a template image from a template database according to the search index; performing a calibration operation according to the feature image, wherein the calibration operation comprises: adjusting a resolution of the feature image according to a resolution of the template image; performing a shifting operation according to the feature image, to generate a plurality of candidate images; and comparing a key block of each of the plurality of candidate images with a key block of the template image to generate a difference map and a comparison result.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present disclosure.

Figure 1:
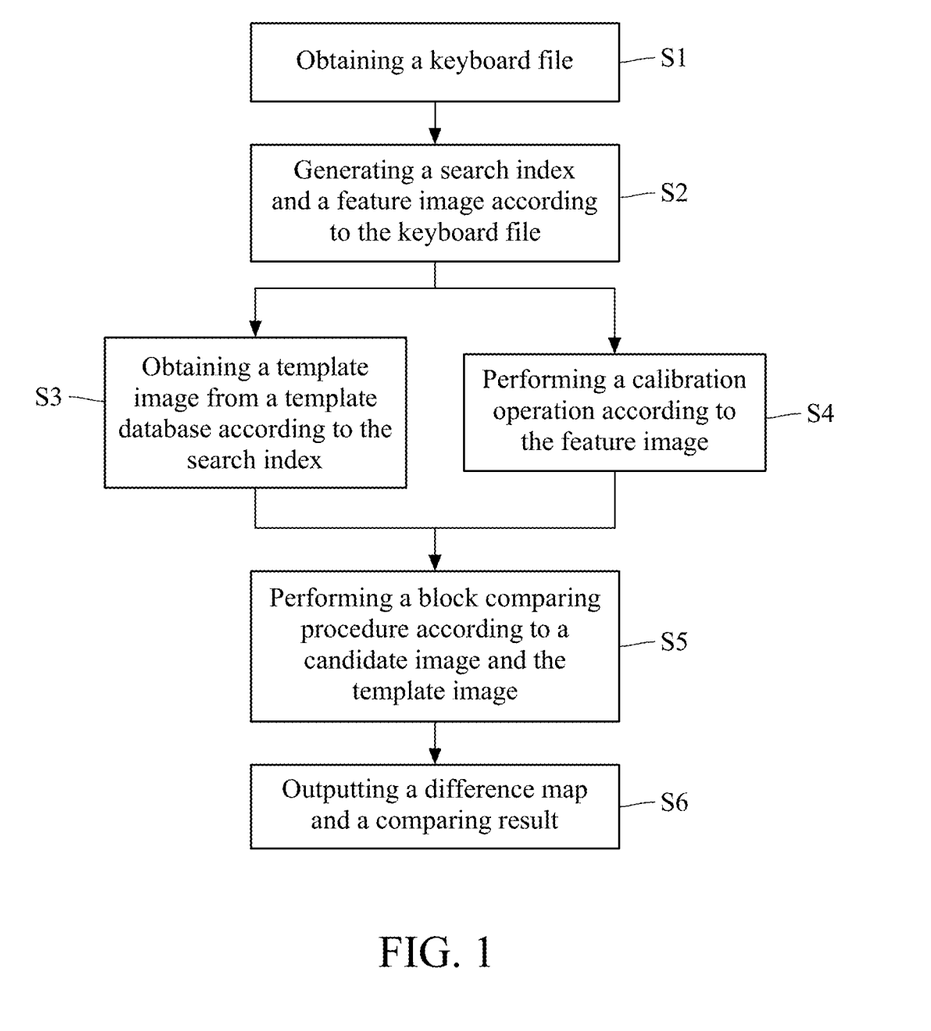
FIG. 1 is a flow chart of the keyboard file verification method based on image processing according to an embodiment of the present disclosure.

Please refer to FIG. 1, which is a flow chart of the keyboard file verification method based on image processing according to an embodiment of the present disclosure. The proposed method is applicable to a personal computer or an internet server having a processor, and each step in FIG. 1 is mainly performed by the processor.

Figure 2:
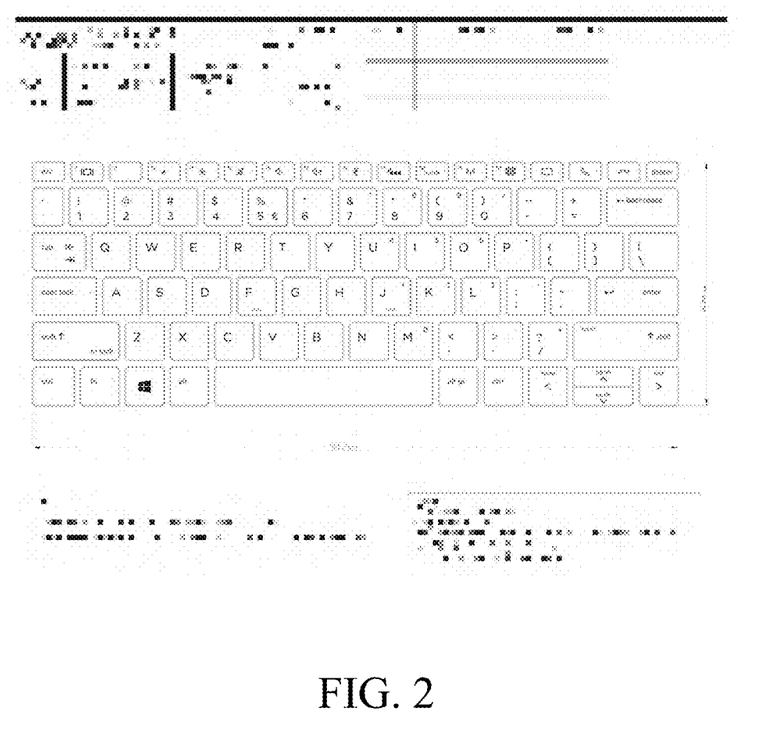
FIG. 2 is a schematic diagram of the keyboard file content in an example.

Step S1 represents "obtaining a keyboard file". In an embodiment, the keyboard file obtained by the processor from a storage device may be a single-page portable document format (PDF) file. FIG. 2 is a schematic diagram of the keyboard file content according to an example. The keyboard file comprises a keyboard image and keyboard information. The keyboard image may be, for example, a gray-scale image generated by the camera capturing a keyboard sample, or a digital image file generated by a keyboard designer operating the graphic software. The keyboard information comprises at least one of the following items: the project name, brand, supplier, country code, keyboard size, keyboard type (e.g., large/medium/small keyboard, comprising a backlight keyboard or not, comprising a point stick or not, etc.), and production date. The keyboard information described above may be recorded in at least one of the following items: the keyboard file content, the file name and the file path of the keyboard file, etc., but the present disclosure does not specifically limit the location where the keyboard information is recorded.

Step S2 represents "generating a search index and a feature image according to the keyboard file". Please refer to FIG. 3, which is a detailed flow chart of step S2 in FIG. 1.

Figure 3:
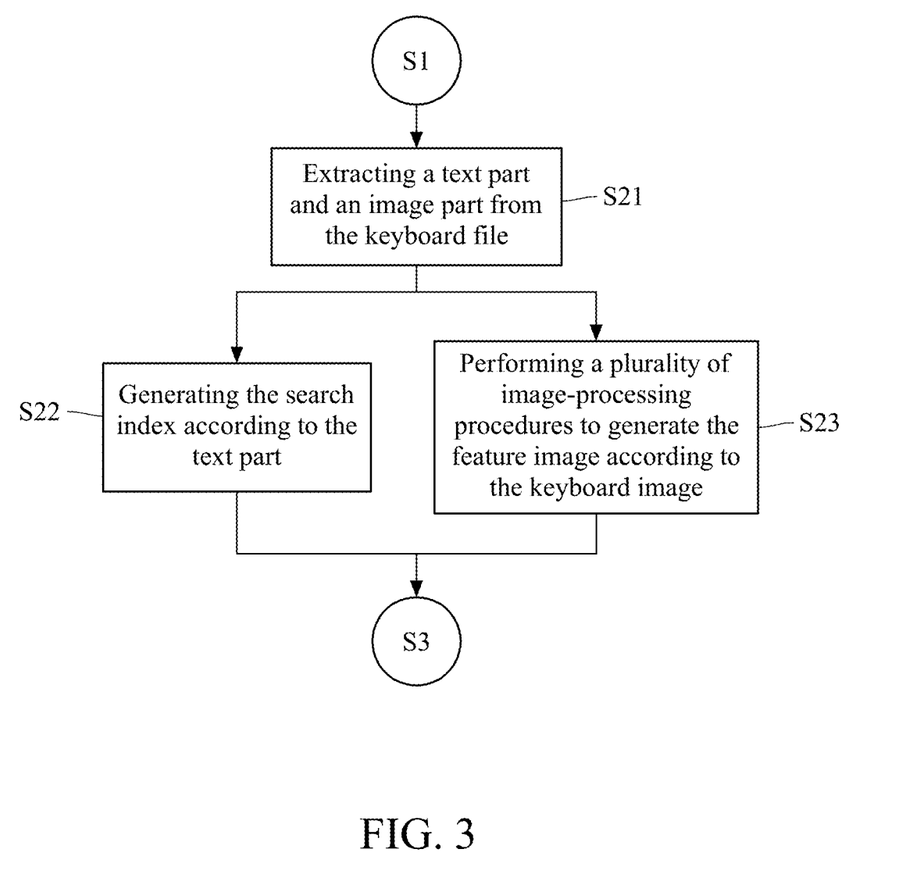
FIG. 3 is a detailed flow chart of a step in FIG. 1.

Step S21 represents "extracting a text part and an image part from the keyboard file". In an embodiment, the processor performs a software "Pymupdf" to separately extract the text part and the image part from the PDF file, wherein the text part comprises the keyboard information described above, and the image part is a keyboard image of PNG file format.

Step S22 represents "generating a search index according to the text part". Specifically, the processor performs a program to set the content of the text part associated with the keyboard information as the search index.

Step S23 represents "performing a plurality of image-processing procedures to generate the feature image according to the keyboard image". These image-processing procedures performed by the processor are configured to extract a keyboard contour and determine a keyboard region. The keyboard contour comprises an outer outline of the keyboard body and grids of all keys.

Figure 4:
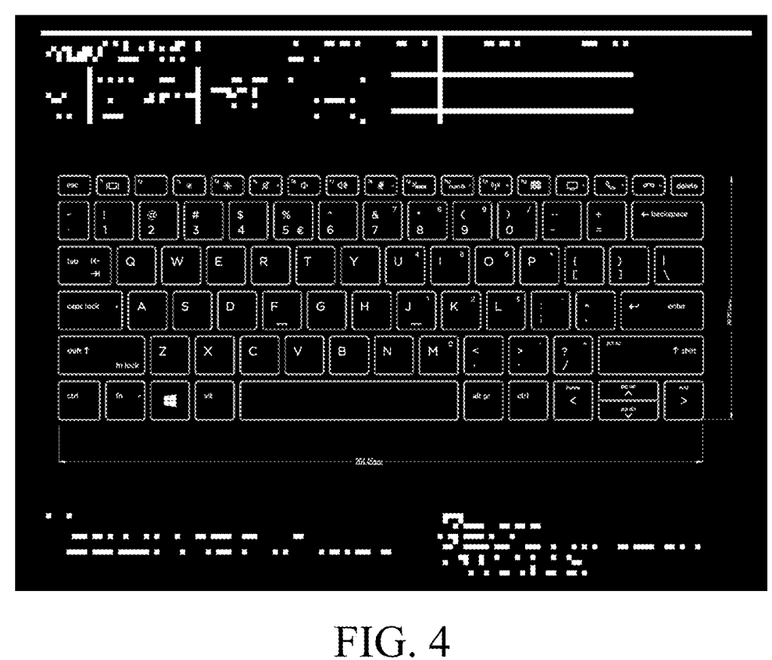
FIG. 4 is a schematic diagram of a binarization image corresponding to the keyboard file in an example.

The processor converts the keyboard image to a gray-scale image for extracting the keyboard contour, and then adopts the Otsu algorithm (which is an automatic image thresholding method) to degrade the gray-scale image to a binarization image. FIG. 4 is a schematic diagram of a binarization image corresponding to the keyboard file in an example. Regarding the binarization image, the processor adopts 8-connectivity of the connected component labeling (CCL) method to determine the region belonging to the keyboard in the binarization image. The processor further adopts FindContour function in OpenCV to obtain a rough keyboard contour.

The processor performs a filling operation according to keyboard contour for determining the keyboard region. The filling operation fills pixels inside the closed contour with specified color, thereby filtering out the non-closed contour region. The processor performs filtering according to the area of connected region, filled degree, and keyboard size obtained from the keyboard information, wherein the keyboard size may comprise the aspect ratio or the area of the keyboard, and the processor confirms whether the connected region enclosed by the keyboard contour belongs to the keyboard or not, thereby adjusting the threshold of the binarization operation.

Figure 5:
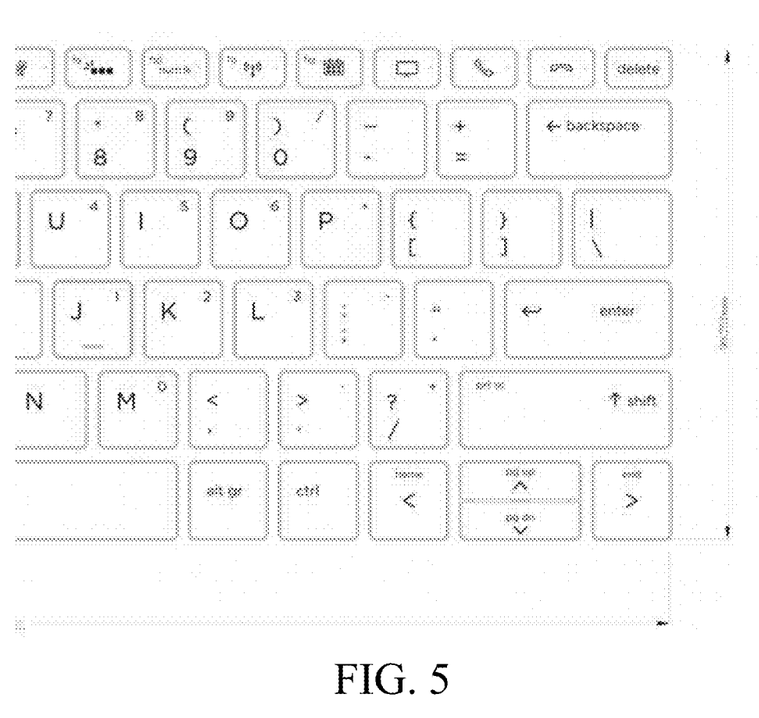
FIG. 5 is a schematic diagram of a guiding line in the keyboard image in an example.

In addition, according to the binarization image after performing the filling operation, the processor further performs the open operation in the morphological processing, thereby filtering out the guiding lines used as instructions in the original keyboard image. FIG. 5 is a schematic diagram of a guiding line in the keyboard image in an example. Lines at the right side and the upper side of the keyboard in FIG. 5 are leading lines, these lines are used to denote the length and width of the keyboard, but these leading lines belong to an unnecessary information in the verification of the keyboard file.

Figure 6:
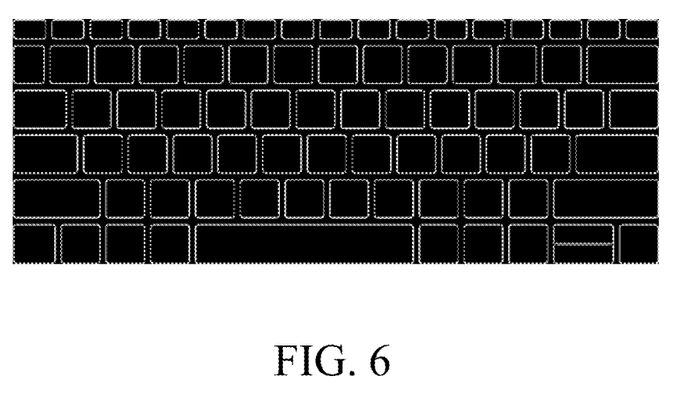
FIG. 6 is a schematic diagram of a part of the filled grid graph in an example.

At last, the processor performs a finding operation for adjacent objects. This operation integrates the filled key regions that are close enough iteratively, generates a region belonging to the keyboard in the binarization image, and outputs a filled grid graph. In other words, during the step of finding adjacent objects, there are a plurality of un-clustered regions. The processor integrates these dispersed small regions and selects the maximal region therefrom as the keyboard region. FIG. 6 is a schematic diagram of a part of the filled grid graph in an example.

The processor calculates a quantity of keys in the filled grid graph, thereby determining to which of the large, medium, and small the keyboard type belongs to, and then sets the determined keyboard type as the search index. The aforementioned keyboard type can also be set in step S22, which is not limited by the present disclosure.

Figure 7:
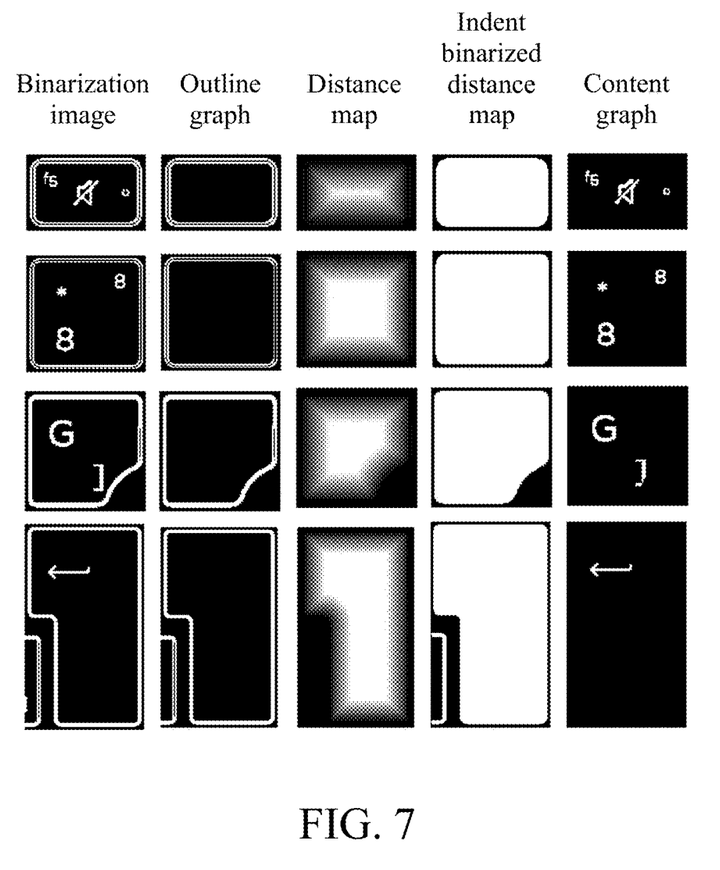
FIG. 7 is a schematic diagram of two sets of feature images in an example.

The processor performs the "Distance transform" function in OpenCV according to the filled grid graph, for calculating the distances between all pixels inside the inner edge of each key's contour and the inner edge of the key's contour, in order to generate a distance map. The processor performs a binarization operation on multiple calculated distance values to separate contour and content. In addition, the processor performs an indent operation to the filled grid graph according to the distance map, detects whether the pixels of the key content are touched during the indent operation, and generates a bounding box enclosing the key content. Finally, the processor generates the content graph according to the content of the bounding box. Please refer to FIG. 7, which shows two sets of feature images of two keys, each set of feature images comprises a binarization image, a filled grid graph, a distance map, a binarization distance map generated after the indent operation, and a content graph.

Please refer to FIG. 1. Step S3 represents "obtaining a template image from a template database according to the search index", and Step S4 represents "performing a calibration operation according to the feature image".

In Step S3, the processor uses the keyboard information, such as the brand, supplier, and country code, etc., as the search index for searching template database, and finds one or more template images as the standard of the subsequent comparison. If more than two template images are found, each template image is used for the comparison. In Step S4, the calibration operation comprises a resolution calibration and a shifting calibration. The resolution calibration is to adjust the resolution of the feature image, to make it consistent with the resolution of the template image obtained in Step S4. In addition, each template image in the template database is also established in advance through the process comprising Steps S1, S2, and S4, and the resolutions of all template images can therefore be consistent.

After the resolution calibration is performed, the shifting operation adopts the Enhanced Correlation Coefficient (ECC), which is a standard of similarity metric, to predict parameters of the motion model, and adopts "findTransformECC" function in OpenCV to iterate the motion model configured to generate feature images. The motion model may be a homography matrix or an affine matrix. The processor sets the tolerant error of the iterative process, when the tolerant error is smaller than a threshold, it means that the image can be aligned by the motion model, and thereby achieving the shifting effect. The processor generates a plurality of candidate images according to the feature image and the motion model.

Please refer to FIG. 1. Step S5 represents "performing a block comparing procedure according to a candidate image and the template image". The block comparing procedure comprises performing a comparison of Structural Similarity Index Measure (SSIM) on a basis of key-scale (patch-wise), and performing wavelet hashing algorithm before SSIM for compensating the insufficient of SSIM. Regarding some images with simple structure, when the comparison of SSIM meets an all-black image, it is possible that the score generated by SSIM does not reflect the difference. Therefore, the processor performs the wavelet hashing algorithm to convert the candidate image into a frequency domain and generates a hash value, and then calculates a Hamming distance between the candidate image and the template image to represent the degree of difference between the original keyboard image and the template image. If the degree of difference of a region is too large, the processor may highlight the difference map of the region and label it as an abnormal area for subsequent human re-examination. If the degree of difference is within the tolerance range, the processor continues with the image similarity detection according to SSIM.

Since keyboard samples manufactured by different suppliers may have some errors on the gaps between the keys, in order to improve the fault tolerance and stability during the comparison, during the process of image similarity detection according to SSIM, the present disclosure additionally introduces a shifting operation. The shifting operation shifts the block-scale feature image to generate a plurality of shifted images according to a specified direction (e.g. up, down, left, or right) and a specified length (e.g. smaller than or equal to the length of 5 pixels), then calculates a similarity between each shifted image and the template image by SSIM, and selects the shifted image with the minimal error value for the subsequent process. In other words, the processor performs a small displacement of the key part the candidate image in key-scale to find a shifted image that has the highest degree of alignment with the key part of the template image. Through the above method, the present disclosure can reduce the regional error generated due to the difference in resolution.

Figure 8:
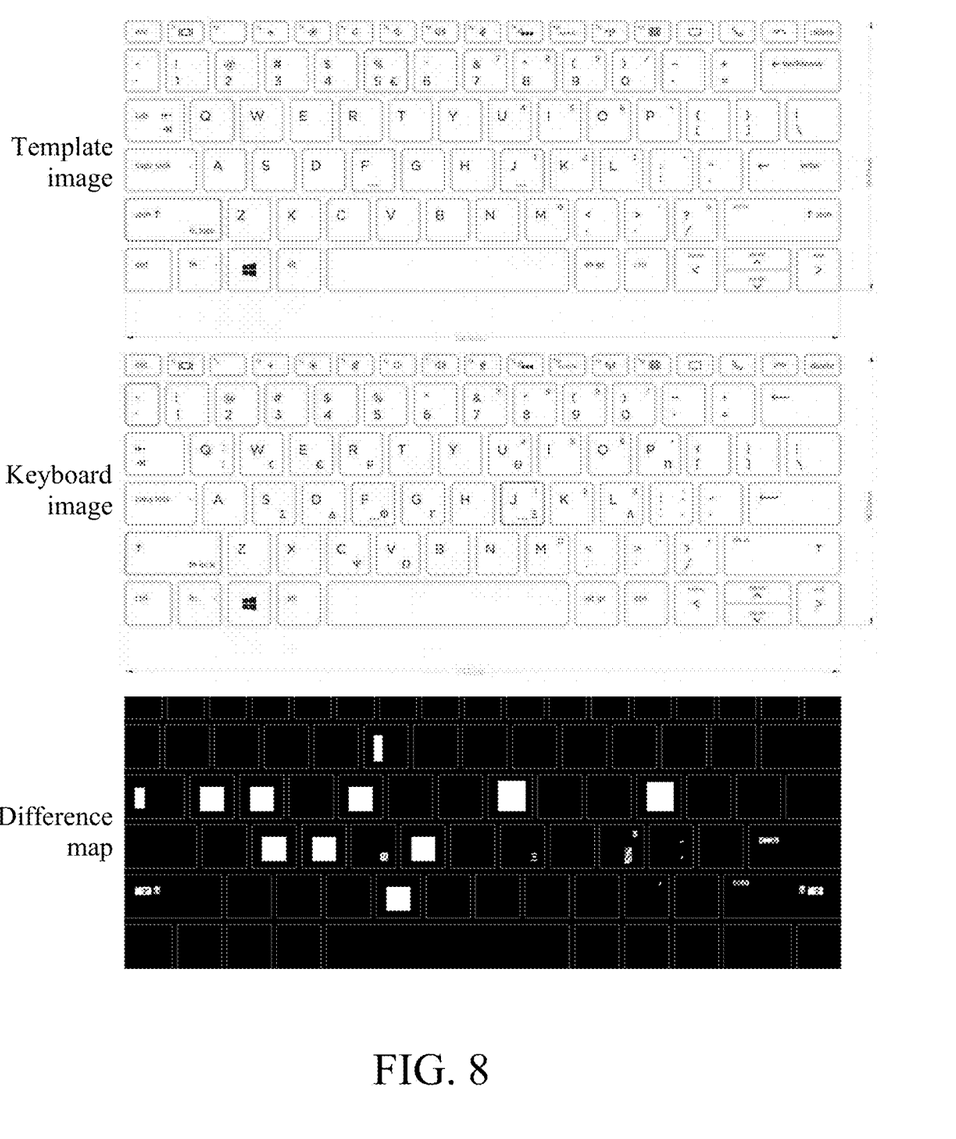
FIG. 8 is a schematic diagram of a template image, a keyboard image, and a difference map.

Please refer to FIG. 1. Step S6 represents "outputting a difference map and a comparison result". Specifically, after finishing Step S5, the processor generates a candidate difference map according to the comparison process between each candidate image and the template image. The candidate difference map is a gray-scale image, in which values of pixels in the image may represent the degree of difference. The processor calculates a sum of differences of all keys according to each candidate difference map, in which the candidate image corresponding to the candidate difference map with the minimal sum of differences represents that its alignment with the template image is the best. The processor further determines whether the sum of difference is greater than a threshold. If the determination result is "yes", it represents the degree of difference between the keyboard image and the template image is too large, and the comparison result has to be sent to a quality assurance personnel for further checking. FIG. 8 is a schematic diagram of a template image, a keyboard image, and a difference map obtained from the keyboard file, in which the multiple white blocks represents the differences between the keyboard and the template image. In addition, the comparison result outputted by the processor comprises the following files: a description file, the keyboard image, the filled grid graph, the content graph, the template image most similar to the content graph in the template database, the difference map, and a label denoting the difference. In an embodiment, the file format of the description file is Comma-Separated Values (CSV), and the content of the description file records the following information: the brand, project name, supplier, file name and file path of the keyboard file, country code, keyboard type, storage position of the template image, whether the comparison process succeeds, the difference number of key, and the reason for determining the difference, etc.

The present disclosure proposes a keyboard file verification method based on image processing. The present disclosure integrates a plurality of techniques of image processing to improve the inconvenience of visual inspection of keyboard defects by quality assurance personnel in the prior art, enhances the accuracy of the defect detection, and ensures the input keyboard design of the keyboard file conforms to the reference design.

In view of the above, the present disclosure proposes a keyboard file verification method based on image processing, which converts a raw document of the keyboard design to structured visual features, and mimics the process of human visual perception. The present disclosure matches the raw document of the keyboard file and the template image of the template database, with the perceptually different regions of the input image being highlighted.

What is claimed is:

1. A keyboard file verification method based on image processing, comprising controlling a processor to perform following operations:

obtaining a keyboard file;
generating, according to the keyboard file, a search index and a feature image;
obtaining a template image from a template database according to the search index;
performing a calibration operation according to the feature image, wherein the calibration operation comprises:
adjusting a resolution of the feature image according to a resolution of the template image;
performing a shifting operation according to the feature image, to generate a plurality of candidate images; and
comparing a key block of each of the plurality of candidate images with a key block of the template image to generate a difference map and a comparison result,
wherein comparing the key block of each of the plurality of candidate images and the key block of the template image to generate the difference map and the comparison result comprises:
performing a wavelet hashing algorithm to convert each of the plurality of candidate images to a frequency domain;
calculating a structural similarity index measure and a Hamming distance of each of the plurality of candidate images and the template image to generate a plurality of candidate difference maps; and
calculating a sum of errors of each of the plurality of candidate difference maps, wherein the difference map is one of the plurality of candidate difference maps with the minimal sum of errors.

2. The keyboard file verification method based on image processing of claim 1, wherein the keyboard file is a portable document format, the keyboard file comprises a keyboard information and a keyboard image, and the keyboard information is associated with at least one of a content of the keyboard file, a file name and a file path.

3. The keyboard file verification method based on image processing of claim 2, wherein generating the feature image according to the keyboard file comprises:

converting the keyboard image to a gray-scale image;
performing an Otsu algorithm to generate a binarization image according to the gray-scale image;
performing a connected component labeling method according to the binarization image to determine a plurality of connected regions in the binarization image;
obtaining a contour according to each of the plurality of connected regions, and performing a filling operation according to the contour; and
performing a filtering operation according to an area of each of the plurality of connected regions, a filled degree and a keyboard size of the keyboard information, to determine whether each of the plurality of connected regions belongs to a keyboard region and output a filled grid graph.

4. The keyboard file verification method based on image processing of claim 3, wherein generating the feature image according to the keyboard file comprises:

performing a distance conversion function to generate a distance map according to the filled grid graph;
performing an indenting operation to the filled grid graph according to the distance map and generating a bounding box, wherein the bounding box is used to enclose a key content; and
generating a content graph according to the bounding box;

wherein the feature image comprises the binarization image, the filled grid graph, the distance map, the bounding box, and the content graph.

5. The keyboard file verification method based on image processing of claim 4, further comprising:
   calculating a quantity of keys according to the filled grid graph; and
   determining a keyboard type according to the quantity of keys, and setting the keyboard type as the search index.

6. The keyboard file verification method based on image processing of claim 1, wherein calculating the structural similarity index measure of each of the plurality of candidate images and the template image comprises:
   shifting the feature image according to each of the plurality of candidate images, a specified direction, and a specified length to generate a plurality of shifted images.

7. The keyboard file verification method based on image processing of claim 1, wherein performing the shifting operation to generate the plurality of candidate images according to the feature image comprises:
   generating a motion model according to an enhanced correlation coefficient, wherein the motion model is a homography matrix or an affine matrix; and
   generating the plurality of candidate images according to the feature image and the motion model.

* * * * *